Jan. 3, 1928.

P. M. G. TOULON 1,654,950

DEVICE FOR CONTROLLING THE CURRENT PRODUCED BY VAPOR RECTIFIERS

Filed May 22, 1925     2 Sheets-Sheet 1

Inventor
P. M. G. Toulon
By Marks Clerk
Attys

Jan. 3, 1928.                                                                          1,654,950
                               P. M. G. TOULON
         DEVICE FOR CONTROLLING THE CURRENT PRODUCED BY VAPOR RECTIFIERS
                              Filed May 22, 1925                    2 Sheets-Sheet 2
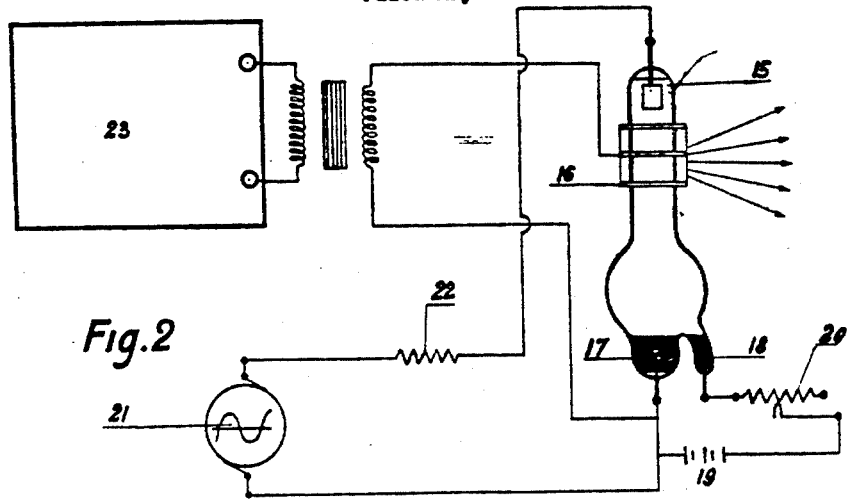
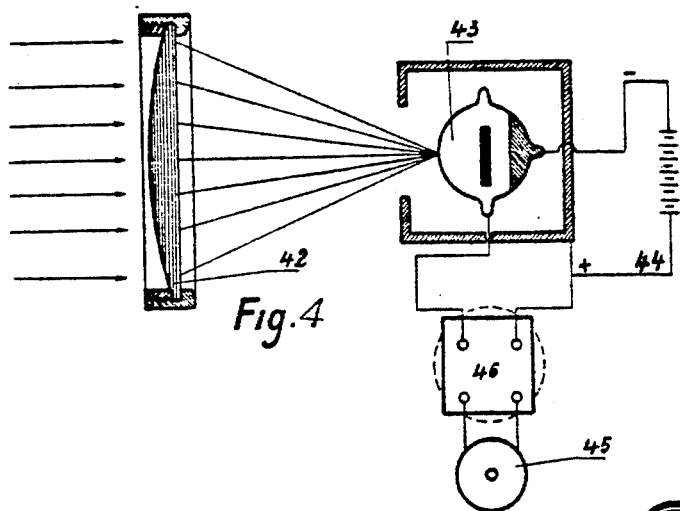
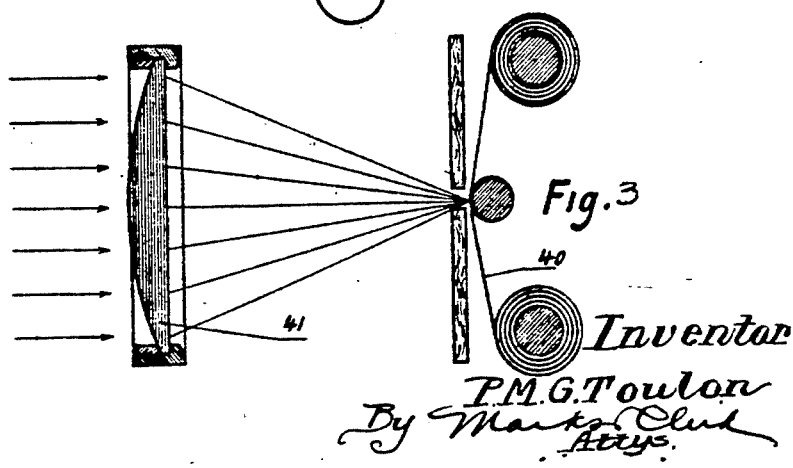
Inventor
P.M.G.Toulon Patented Jan. 3, 1928.

1,654,950

UNITED STATES PATENT OFFICE.

PIERRE MARIE GABRIEL TOULON, OF PARIS, FRANCE, ASSIGNOR, BY MESNE ASSIGN-
MENTS, TO GENERAL ELECTRIC COMPANY, A CORPORATION OF NEW YORK.

DEVICE FOR CONTROLLING THE CURRENT PRODUCED BY VAPOR RECTIFIERS.

Application filed May 22, 1925, Serial No. 32,226, and in France May 27, 1924.

Patent applications Serial Numbers 682,093 and 682,099 show means whereby vapor rectifiers can be used for nearly all purposes for which ionic valves are generally used. In accordance with the aforesaid applications conducting parts such as a metallic coating surrounding the rectifier are provided, the potential of which is acted upon so as to prevent, when desired, the arc from forming in the rectifier before a given moment of the half-period during which it is normally ignited.

My invention is similar in some respects to those disclosed by the aforesaid applications, but relates more particularly to an improved electro-optic relay apparatus which may be readily operated to emit light of an intensity dependent on electrical impulses.

Such an electro-optic relay can be used for signalling in optic telegraphy, the source of light being the rectifier provided with its coating. The brilliancy of the arc varies with the potential of the coating and the luminous rays directed towards the receiving station are observed directly or else are adapted to produce electric signals corresponding to the variations of the potential of the coating. The signals which make the said potential vary can either be produced by a contact breaker connected with the coating or by electric or radioelectric signals given out by a distant station and received by an electric circuit feeding the coating. This transformation of electric or radioelectric signals into optical signals can be made either at the transmitting station, or at the receiving station. In the first case, the transmission at a distance being produced by luminous rays has the advantage of constituting a secret signalling device which can only be detected along the path of the said rays. In the second case of electric or radio-electric signals being transformed into optical signals at the receiving station, these signals can be used for communicating with an aircraft with more ease than through radioelectric signals which are difficult to receive by hearing, due to the noise of the motors, and can be transformed on the aircraft itself into optical signals.

In some applications the optical signals produced by the change in the brilliancy of the arc according to the electric signals received by the coating can be registered by photography so as to cause them to be either read directly on the photographic band or changed back again into optical signals with or without electric transmission.

The appended drawings show, by way of example, applications of the above mentioned connections.

Figures 1 and 2 are diagrams illustrating apparatus specially adapted for optically transmitting telegraphic signals.

Fig. 3 illustrates one form of apparatus that may be utilized to receive the signals transmitted by the apparatus of Figs. 1 and 2.

Fig. 4 shows a device for transforming the optic signals produced into electric current impulses.

Figure 1:
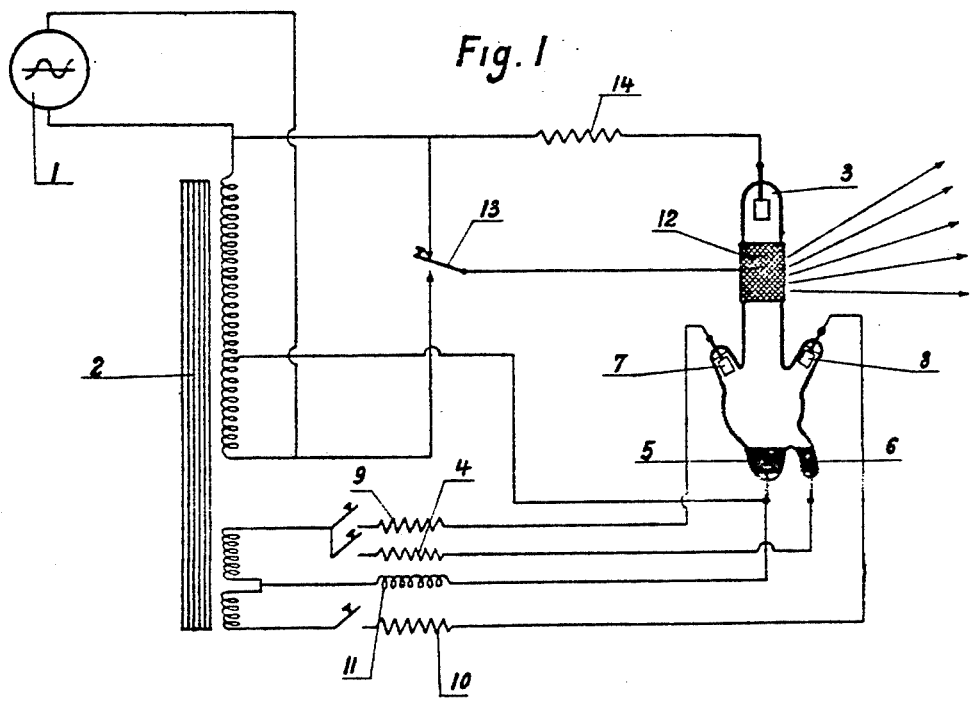

Fig. 1 is a diagram of the connections for a rectifier used for optic telegraphy. An alternating current generator 1 feeds for instance a suitable auto-transformer feeding a rectifier through the anode 3 and the cathode 5 which is ignited by means of the auxiliary anode 6 fed through the resistance 4. The exciting electrodes 7 and 8 fed through the resistances 9 and 10 and the induction coil 11 keep it ignited. The feeding of these electrodes 6, 7 and 8 can be provided, for instance, by an auxiliary winding on the auto-transformer 2.

The coating 12 which, as explained in patent application Serial No. 682,099, allows the intensity of the current to be varied and therewith the brilliancy of the arc, is disposed so as not to hide the light produced by the apparatus.

This coating can be made for instance out of a very fine gauze provided with a few large holes or of a helical wire rolled round the tube or else a series of belts or any other device.

The contact breaker 13 connects the coating with either end of the winding of the auto transformer and thereby allows the ignition of the arc. The resistance 14 prevents the current feeding the anode from being too great.

Fig. 2 shows diagrammatically the connections in an apparatus for optically transmitting signals which the device receives electrically by a telegraphic or radiotelegraphic device.

The receiver 23 of the telegraphic signals feeds directly if fed with direct current or through a transformer in the case of alternating current the coating 16 which surrounds the anode 15 of a rectifier. The cathode 17 is kept in ignition by a suitable device such as an auxiliary anode 18 fed by the auxiliary D. C. supply 19 through the adjustable resistance 20. The anode 15 is fed by the A. C. supply 21 through a suitable resistance 22.

If the values of the resistances and of the supplies are suitably chosen and adjusted for each transmission the arc will be ignited and produce optical signals.

This optical transmission device for registering and producing signals can be used also for telephonic or radiotelephonic transmissions. In this case, the rectifier should have its coating connected with a transmitting or receiving device for telephonic or radiotelephonic signals. The variations in the brilliancy of the arc are registered on a photographic band which can afterwards be used with a photoelectrical device such as a photoelectrical cell or a selenium cell which transforms the changes in the brilliancy which it receives into electrical modulations which act upon a telephonic receiver.

In order to increase the brilliancy of the arc, without producing an exaggerated heating of the whole of the tube which would prevent a proper working of the coating and a proper inspection of the brilliancy of the arc, it is preferable to provide the lamp with a narrow part along the axis of said lamp and in the direction which is to be lighted. The luminous rays can be projected by a lens or by a suitable mirror.

In order to ensure secrecy to the optic signals, the visible part of the spectrum of the rays produced can be eliminated by a suitable screen which only lets either the ultraviolet or the ultra-red rays pass.

The optically transmitted signals can be received directly by the eye or by means of an optical device or else be registered on a photographic film 40 as shown on Fig. 3, the luminous rays being concentrated by means of a lens or an optic system 41.

Figure 4 is a diagram of the connections which allow the optic transmission of telephonic or radiotelephonic signals. The lens 42 concentrates the luminous rays received from a transmitting station such as the one shown on Fig. 1 or 2 on a photoelectric cell 43 the electrodes of which are fed by a constant difference of potential produced for instance by the battery 44.

If the frequency of the current received is musical, it can be perceived by the telephonic receiver 45, for instance through the amplifier 46.

What I claim is:

1. The combination of alternating current supply means, a continuously excited mercury arc rectifier provided with a cathode and an anode connected to said supply means for producing an arc and with a control electrode perforated for permitting the emission of light from said arc, and means connected between said cathode and control electrode for varying the intensity of said light.

2. The combination of an alternating current source, a continuously excited vapor electric device connected to said source for producing an arc and provided with a perforated electrode arranged to surround said arc, and means connected to said electrode for varying the intensity of the light emitted through the perforations of said electrode.

3. The combination of an alternating current source, a continuously excited mercury arc rectifier provided with a cathode and an anode connected to said source and with a perforated electrode arranged to surround the arc produced between said cathode and said anode by said source, and means connected between said cathode and said electrode for modulating the intensity of the light emitted through said electrode.

4. The combination of alternating current supply means, an arc device provided with a cathode and an anode connected to said supply means and with a wire gauze control electrode arranged to surround the arc of said device, and means connected between said cathode and control electrode for modulating the intensity of said light.

5. The combination of alternating current supply means, an arc device provided with a cathode and an anode connected to said supply means and with a wire gauze control electrode arranged to surround the arc of said device, means connected between said cathode and control electrode for modulating the intensity of said light, and means for producing an electrical effect dependent on the intensity of said light.

In witness whereof I have hereunto set my hand.

PIERRE MARIE GABRIEL TOULON.